United States Patent
Guo et al.

(10) Patent No.: US 12,438,180 B2
(45) Date of Patent: Oct. 7, 2025

(54) BATTERY FORMATION AND GRADING DEVICE

(71) Applicant: CONTEMPORARY AMPEREX TECHNOLOGY (HONG KONG) LIMITED, Hong Kong (CN)

(72) Inventors: Yitai Guo, Ningde (CN); Wu Lin, Ningde (CN); Zhihui Wang, Ningde (CN); Jiayi Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 282 days.

(21) Appl. No.: 18/466,291

(22) Filed: Sep. 13, 2023

(65) Prior Publication Data

US 2024/0266579 A1  Aug. 8, 2024

Related U.S. Application Data (63) Continuation of application No. PCT/CN2023/092248, filed on May 5, 2023.

(30) Foreign Application Priority Data

Feb. 7, 2023  (CN) .......................... 202320143682.6

(51) Int. Cl.
*H01M 10/04* (2006.01)
*H01M 10/613* (2014.01)
(Continued)

(52) U.S. Cl.
CPC ..... *H01M 10/0404* (2013.01); *H01M 10/613* (2015.04); *H01M 10/63* (2015.04);
(Continued)

(58) Field of Classification Search
CPC .. H01M 10/0404; H01M 10/60; H01M 10/61; H01M 10/613; H01M 10/63;
(Continued)

(56) References Cited

U.S. PATENT DOCUMENTS

2009/0200987 A1* 8/2009 Saito .................. H01M 10/613
320/153
2021/0210801 A1 7/2021 Cao et al.

FOREIGN PATENT DOCUMENTS

CN 210 200 916 U 3/2020
CN 212 659 851 U 3/2021
(Continued)

OTHER PUBLICATIONS

Notice of Intent to Grant dated May 28, 2025 for application EP 23 764 548.6.
(Continued)

*Primary Examiner* — Paul Dinh
(74) *Attorney, Agent, or Firm* — Ladas & Parry LLP (57) ABSTRACT

This application relates to the field of battery manufacturing technologies and provides a battery formation and grading device including: a box having an accommodating space; a temperature control apparatus, provided on the box, including a semiconductor cooling sheet, where two opposite sides of the semiconductor cooling sheet are configured as a cooling surface and a heating surface, the cooling surface being arranged facing the inside of the box and the heating surface being arranged facing the outside of the box. The technical solution of this application improves the efficiency of temperature control inside the battery formation and grading device and reduces the cost of temperature control.

8 Claims, 4 Drawing Sheets

(51) Int. Cl.
*H01M 10/63* (2014.01)
*H01M 10/6554* (2014.01)
*H01M 10/6563* (2014.01)
*H01M 10/658* (2014.01)

(52) U.S. Cl.
CPC ... *H01M 10/6554* (2015.04); *H01M 10/6563* (2015.04); *H01M 10/658* (2015.04)

(58) Field of Classification Search
CPC ......... H01M 10/6554; H01M 10/6563; H01M 10/658; H01M 10/4285; H01M 10/44; Y02E 60/10; Y02P 70/50; H05K 7/20
USPC ....................................................... 320/153
See application file for complete search history.

(56) References Cited

FOREIGN PATENT DOCUMENTS

| | | |
|---|---|---|
| CN | 207441892 U | 10/2023 |
| CN | 217509286 U | 10/2023 |

OTHER PUBLICATIONS

Extended European Search Report corresponding to copending application 23764548.6 mailed Oct. 29, 2024.
China Notice of Grant for Application No. 20230224009232​00, dated Feb. 24, 2023, 1 page.
International Search Report and Written Opinion for Application No. PCT/CN2023/092248, mailed on Oct. 12, 2023, 6 pages.

* cited by examiner

BATTERY FORMATION AND GRADING DEVICE

CROSS-REFERENCE TO RELATED APPLICATIONS

This application is a continuation of International application PCT/CN2023/092248 filed on May 5, 2023 that claims priority to Chinese patent application 202320143682.6, filed on Feb. 7, 2023. The subject matter of these applications is incorporated herein by reference in its entirety.

TECHNICAL FIELD

This application relates to the field of battery manufacturing technologies, and specifically to a battery formation and grading device.

BACKGROUND

This section provides only background information relevant to this disclosure, which is not necessarily prior art.

In a manufacturing process of traction batteries, formation and grading are critical steps. The formation and grading of traction batteries is carried out in a battery formation and grading device, and the battery needs to be charged and discharged for a period during the process of formation and grading. A current, when passing through power lines, generates a certain amount of heat, and when the number of power lines reaches a specified level, a temperature difference is produced between the environment and a storage space for supporting the battery, which causes changes to the battery characteristics.

In a related technology, to regulate temperature of batteries placed in a battery formation and grading device, it is common to add axial flow fans for duct circulation temperature control in the battery formation and grading device. Such temperature control method is inefficient, and requires additional provision of cold air, resulting in high costs of the temperature control.

SUMMARY

In view of the foregoing problems, this application provides a battery formation and grading device to improve the efficiency of temperature control in battery formation and grading devices and reduce the cost of temperature control.

This application provides a battery formation and grading device including: a box having an accommodating space; a rack disposed in the accommodating space for battery supporting; and a temperature control apparatus, provided on the box, including a semiconductor cooling sheet, where two opposite sides of the semiconductor cooling sheet are configured as a cooling surface and a heating surface, the cooling surface being arranged facing the inside of the box and the heating surface being arranged facing the outside of the box.

According to the battery formation and grading device provided in this application, the cooling surface of the semiconductor cooling sheet is arranged facing the inside of the box, and the heating surface of the semiconductor cooling sheet is arranged facing the outside of the box. The cold generated by the cooling surface of the semiconductor cooling sheet flows into the box, and the heat generated by the heating surface of the semiconductor cooling sheet flows outside of the box. In this way, temperature inside the box is regulated, and the cooling efficiency of the box is improved. Since no additional cold air is needed, the semiconductor cooling sheet requires less voltage, helping to reduce costs.

In addition, the battery formation and grading device provided according to this application may have the following additional technical features:

In some implementations of this application, the temperature control apparatus further includes a first fan and a second fan, where the first fan is provided on the cooling surface and is configured to blow air into the box, and the second fan is provided on the heating surface and is configured to blow air outside of the box.

The first fan is used to blow the cold dissipated from the cooling surface of the semiconductor cooling sheet into the box, thereby achieving rapid flow of the cold into the box to improve cooling efficiency. In addition, the second fan is used to blow the heat dissipated from the heating surface of the semiconductor cooling sheet outside the box, thereby further improving the cooling efficiency.

In some implementations of this application, the temperature control apparatus further includes: a first heat sink provided between the cooling surface and the first fan and fitting with the cooling surface; and a second heat sink provided between the heating surface and the second fan and fitting with the heating surface.

The first heat sink functions to conduct and dissipate heat. With the first heat sink fitting with the cooling surface, the cold generated by the cooling surface is quickly dissipated, and with the help of the first fan, the cold dissipated from the cooling surface is quickly blown to the inside of the box, thereby improving the cooling efficiency of the battery and various device parts in the box. Similarly, with the second heat sink fitting with the heating surface, the heat generated by the heating surface is quickly dissipated, and with the help of the second fan, the heat dissipated from the heating surface is quickly blown to the outside of the box.

In some implementations of this application, the first heat sink is provided with a first thermal insulation layer on a side facing the second heat sink; and/or, the second heat sink is provided with a second thermal insulation layer on a side facing the first heat sink.

The first thermal insulation layer and the second thermal insulation layer both have a thermal insulation effect, reducing transfer of cold and heat between the first heat sink and the second heat sink, which in turn can improve stability of the temperature control apparatus in controlling the temperature inside the box.

In some implementations of this application, the first heat sink is bonded to the cooling surface and the first fan is fixedly connected to the first heat sink via a first fastener; and/or, the second heat sink is bonded to the heating surface and the second fan is fixedly connected to the second heat sink via a second fastener.

The first heat sink is bonded to the cooling surface via a thermally conductive adhesive, which reduces the number of connectors for product assembly, and the first fan is fixedly connected to the first heat sink via a fastener such as screw, which not only helps to improve the stability of installation and fastening of the first fan, but also helps to improve the efficiency of product assembly. Similarly, the second heat sink is bonded to the heating surface via a thermally conductive adhesive, and the second fan is fixedly connected to the second heat sink via a fastener such as screw to further improve the efficiency of product assembly.

In some implementations of this application, the first heat sink and/or the second heat sink includes a sheet heat sink or a honeycomb heat sink.

The sheet heat sink or honeycomb heat sink has higher heat conductivity and higher heat dissipation efficiency, and is simple in structure and easy to assemble. In addition, the sheet heat sink or honeycomb heat sink is easy to process and mold, suitable for mass production.

In some implementations of this application, the battery formation and grading device further includes: a temperature sensor disposed in the box and configured to monitor temperature in the box; and a controller electrically connected to the temperature sensor, the first fan, and the second fan.

The temperature inside the box is monitored in real time using the temperature sensor and transmitted to the controller in real time. When the temperature inside the box is higher than a preset temperature value, the controller implements automatic control to make the semiconductor cooling sheet, the first fan, and the second fan operate, so as to regulate the temperature inside the box, improving automation level of the product.

In some embodiments of this application, the box includes: a top barrier plate, a bottom barrier plate, and a side plate assembly arranged between the top barrier plate and the bottom barrier plate to form an enclosure, where the temperature control apparatus is provided on the top barrier plate and/or the side plate assembly.

The top barrier plate is located above the bottom barrier plate, and the side plate assembly is enclosed between the top barrier plate and the bottom barrier plate and defines an accommodating space for holding the rack, the formation apparatus, and the grading apparatus. The temperature control apparatus may be provided at least on the top barrier plate, on the side plate assembly, or on both the top barrier plate and the side plate assembly to facilitate temperature regulation in the box based on an actual requirement.

In some implementations of this application, the side plate assembly includes a first side plate, a second side plate, a third side plate, and a fourth side plate connected in sequence, where the first side plate and the third side plate are opposite each other, and the second side plate and the fourth side plate are opposite each other, with one of the first side plate and the second side plate provided with a fire door and the other one provided with an inlet/outlet for battery transporting.

The fire door is configured to open when fire breaks out, so that devices and personnel inside the box can be transported outside of the box. The battery inlet/outlet is configured to open when batteries are being transported to the inside of the box or outside of the box to improve the transporting efficiency of battery.

In some implementations of this application, the top barrier plate, the bottom barrier plate, and the side plate assembly are all flame retardant plates.

With the top barrier plate, the bottom barrier plate, and the side plate assembly provided as flame retardant plates, when a fire breaks out in the box body, the risk of fire spreading to the outside can be reduced, and the risk of the flame entering the inside of the box when an open flame appears outside the box can be reduced too, thereby improving safety of using the product.

In some embodiments of this application, the battery formation and grading device further includes: a rack disposed in the accommodating space for battery supporting; a formation apparatus disposed in the accommodating space; and a grading apparatus disposed in the accommodating space.

The rack is configured to support batteries, so as to improve stability of the battery during charging and discharging, the formation apparatus is provided in the accommodating space and configured for battery formation, and the grading apparatus is provided in the accommodating space and configured for battery grading. Specifically, the purpose of formation is to convert at the first charge active material inside the battery into substance having normal electrochemical effect, so that an effective purification film or solid electrolyte interface film is formed on the surface of a negative electrode of the battery. Grading is a process of charging and discharging the activated battery for several full-load cycles to screen the capacity size of the battery and thus determine the grade of the battery.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit the present invention. Throughout the accompanying drawings, the same reference signs represent the same parts. In the accompanying drawings.

REFERENCE SIGNS battery formation and grading device 100;
box 10, temperature control apparatus 20, and rack 30;
top barrier plate 11, bottom barrier plate 12, first side plate 13, second side plate 14, third side plate 15, fourth side plate 16, and accommodating space 17;
semiconductor cooling sheet 21, first fan 22, second fan 23, first heat sink 24, and second heat sink 25; and
inlet/outlet 131, and fire door 151.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "multiple" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of A, presence of both A and B, and presence of B. In addition, the character "/" in this specification generally indicates an "or" relationship between contextually associated objects.

In the description of the embodiments of this application, the term "multiple" means more than two (inclusive). Similarly, "multiple groups" means more than two (inclusive) groups, and "multiple pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in this application as appropriate to specific situations.

Currently, from the perspective of market development, application of traction batteries is being increasingly extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With the continuous expansion of application fields of traction batteries, market demands for traction batteries are also increasing.

In a manufacturing process of traction batteries, formation and grading are critical steps. The formation and grading of traction batteries are carried out in a battery formation and grading box, and the battery needs to be charged and discharged for a period during the process of formation and grading. A current, when passing through power lines, generates a certain amount of heat, and when the number of power lines reaches a specified level, a temperature difference is produced between the environment and a storage space for supporting the battery, which causes changes to the battery characteristics.

In a related technology, to regulate temperature in a battery formation and grading box, it is common to add axial flow fans for duct circulation temperature control in the battery formation and grading box. Such temperature control method is inefficient, and requires additional provision of cold air, resulting in high costs of the temperature control.

To solve the problem of low efficiency and high cost when using axial flow fans to conduct duct circulation temperature control for the battery formation and grading box, a battery formation and grading device is designed in this application. A cooling surface of a semiconductor cooling sheet is used to generate cold and a first fan is used to blow the cold into the box, while heat generated by a heating surface of the semiconductor cooling sheet is blown to the outside of the box via a second fan, so that the temperature inside the battery formation and grading box can be quickly regulated. In this way, a high cooling efficiency is achieved without additional cold, which helps to reduce the cost of temperature control.

The formation and grading device 100 disclosed in this implementation of this application is applicable not only to manufacture of batteries for new energy vehicles, but also to manufacture of batteries for equipment such as aircraft and ships.

Figure 1:
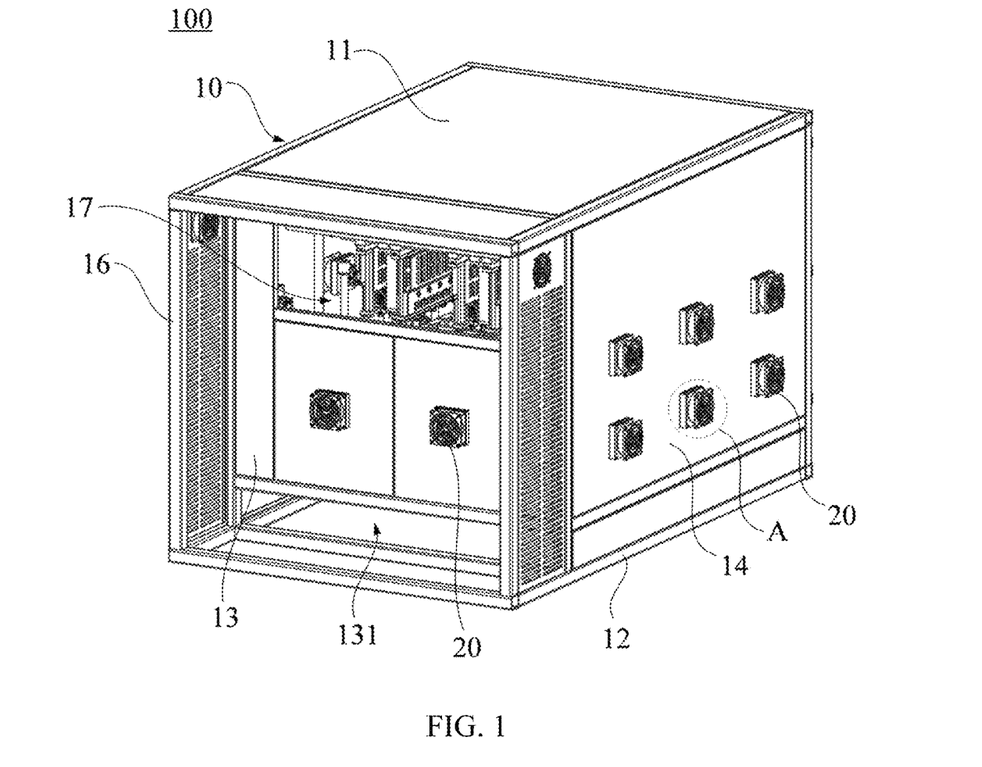
FIG. 1 is a schematic structural diagram of a battery formation and grading device according to some embodiments of this application, from one perspective.
Figure 2:
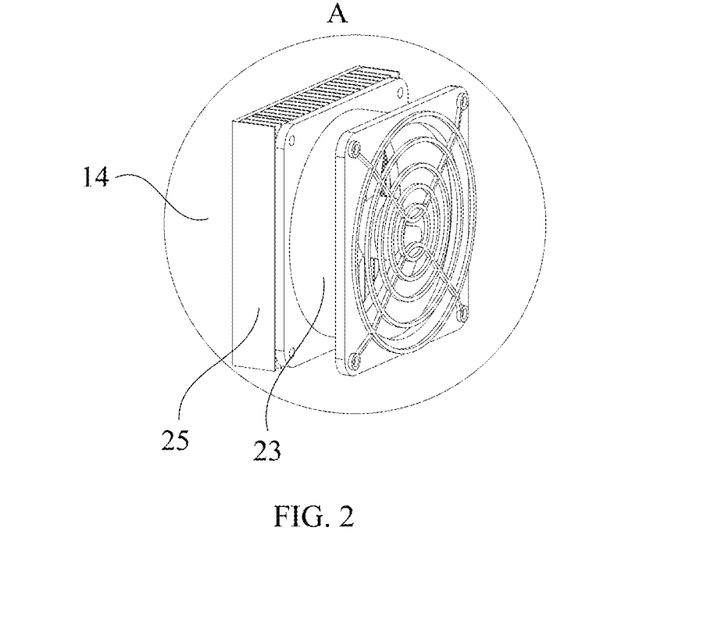
FIG. 2 is a schematic diagram of an enlarged structure of part A in FIG. 1.
Figure 3:
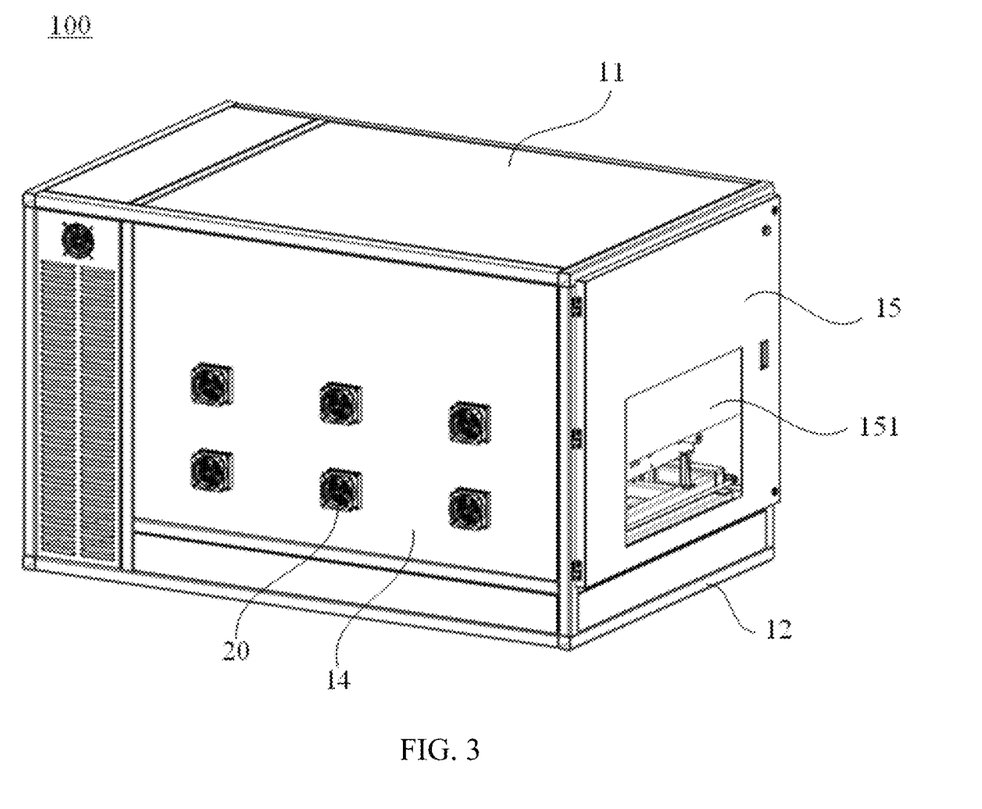
FIG. 3 is a schematic structural diagram of a battery formation and grading device according to some embodiments of this application, from another perspective.
Figure 4:
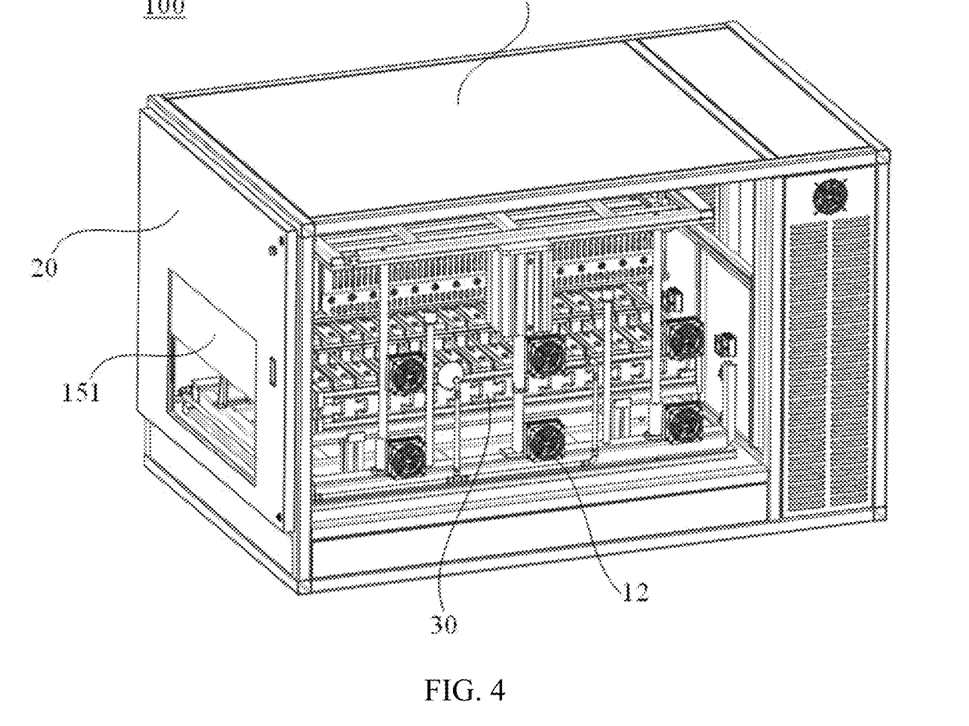
FIG. 4 is a schematic diagram of a partial structure of a battery formation and grading device according to some embodiments of this application.
Figure 5:
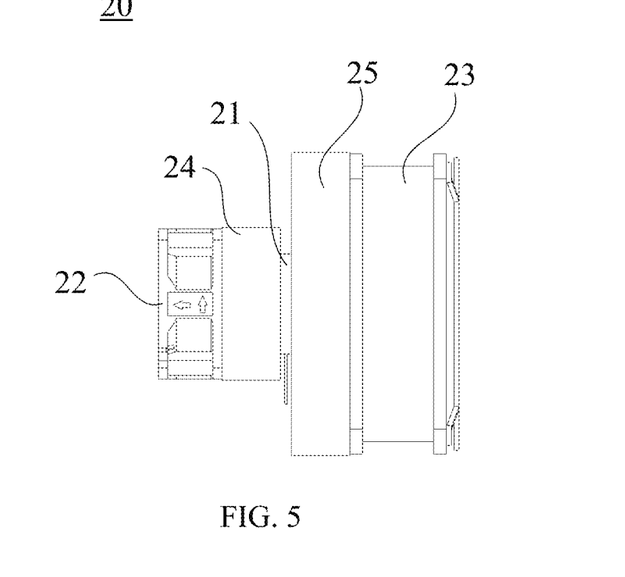
FIG. 5 is a schematic diagram of an assembly structure of a temperature control apparatus according to some embodiments of this application.

Refer to FIG. 1 to FIG. 5. FIG. 1 is a schematic structural diagram of a battery formation and grading device according to some embodiments of this application, from one perspective; FIG. 2 is a schematic diagram of an enlarged structure of part A in FIG. 1; FIG. 3 is a schematic structural diagram of a battery formation and grading device according to some embodiments of this application, from another perspective; FIG. 4 is a schematic diagram of a partial structure of a battery formation and grading device according to some embodiments of this application; and FIG. 5 is a schematic diagram of an assembly structure of a temperature control apparatus according to some embodiments of this application. According to some embodiments of this application, this application provides a battery formation and grading device 100 including a box 10 and a temperature control apparatus 20. The box 10 has an accommodating space 17. The temperature control apparatus 20 is provided on the box 10 and includes a semiconductor cooling sheet 21, a first fan 22, and a second fan 23. Two opposite sides of the semiconductor cooling sheet 21 are configured as a cooling surface and a heating surface, the cooling surface being arranged facing the inside of the box 10 and the heating surface being arranged facing the outside of the box 10. The first fan 22 is provided on the cooling surface and is configured to blow air into the box 10, and the second fan 23 is provided on the heating surface and is configured to blow air outside of the box 10.

The accommodating space 17 defined by the box 10 is used to accommodate a rack 30 for battery placement, a formation apparatus, a grading apparatus, and the like. The semiconductor cooling sheet 21 having a cooling surface and a heating surface is mainly using Peltier effect of a semiconductor material. When a direct current passes through an electric couple formed by two different semiconductor materials connected in series, two ends of the electric couple can respectively absorb heat and emit heat, thereby implementing cooling.

Exemplarily, the first fan 22 and the second fan 23 are both axial flow fans.

The cooling surface of the semiconductor cooling sheet 21 is arranged facing the inside of the box 10, and the heating surface of the semiconductor cooling sheet 21 is arranged facing the outside of the box 10. The first fan 22 is used to blow the cold generated by the cooling surface of the semiconductor cooling sheet 21 into the box 10, and the second fan 23 is used to blow the heat generated by the heating surface of the semiconductor cooling sheet 21 outside of the box 10. In this way, temperature inside the box 10 is regulated, and the cooling efficiency of the box 10 is improved. Since no additional cold air is needed, the semiconductor cooling sheet 21 requires less voltage, helping to reduce costs. Specifically, the semiconductor cooling sheet 21 only needs to connect its leads to a 24 V power supply, and the semiconductor cooling sheet 21 has no moving parts, which is reliable and helps to improve stability of the temperature regulation inside the box 10.

Optionally, in actual installation of the temperature control apparatus 20, an installation port can be provided on the box 10, and the semiconductor cooling sheet 21 of the temperature control apparatus 20 is disposed in the installation port. The cooling surface of the semiconductor cooling sheet 21 is arranged facing the inside of the box 10, and the heating surface of the semiconductor cooling sheet 21 is arranged facing the outside of the box 10. The first fan 22 is disposed in the box 10 to facilitate the blowing of cold into the box 10, and the second fan 23 is disposed outside the box 10 to facilitate the blowing of heat to the outside of the box 10.

Figure 6:
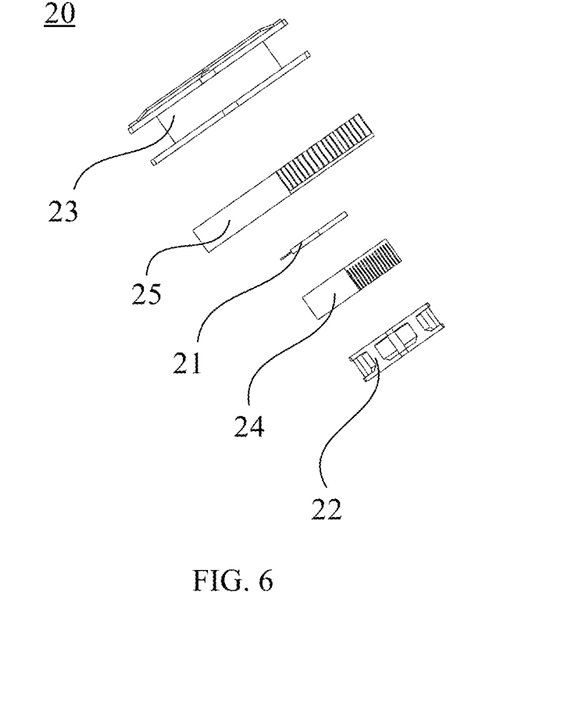
FIG. 6 is a schematic diagram of a breakdown structure of a temperature control apparatus according to some embodiments of this application.

Refer to FIG. 5 and FIG. 6. FIG. 6 is a schematic diagram of a breakdown structure of the temperature control apparatus 20 according to some embodiments of this application. According to some embodiments of this application, the temperature control apparatus 20 further includes a first heat sink 24 and a second heat sink 25. The first heat sink 24 is provided between the cooling surface and the first fan 22 and fitting with the cooling surface, and the second heat sink 25 is provided between the heating surface and the second fan 23 and fitting with the heating surface.

The first heat sink 24 and the second heat sink 25 can conduct heat and improve the heat dissipation efficiency.

Specifically, the first heat sink 24 and the second heat sink 25 have a larger size than the semiconductor cooling sheet 21.

Exemplarily, the size of the second heat sink 25 is larger than the size of the first heat sink 24.

With the first heat sink 24 fitting with the cooling surface, the cold generated the cooling surface is quickly dissipated, and with the help of the first fan 22, the cold dissipated from the cooling surface is quickly blown to the inside of the box 10, thereby improving the cooling efficiency of the battery and various device parts in the box 10. Similarly, with the second heat sink 25 fitting with the heating surface, the heat generated by the heating surface is quickly dissipated, and with the help of the second fan 23, the heat dissipated from the heating surface is quickly blown to the outside of the box 10.

According to some embodiments of this application, the first heat sink 24 is provided with a first thermal insulation layer on a side facing the second heat sink 25.

According to some embodiments of this application, the second heat sink 25 is provided with a second thermal insulation layer on a side facing the first heat sink 24.

According to some embodiments of this application, the first heat sink 24 is provided with a first thermal insulation layer on the side facing the second heat sink 25, and the second heat sink 25 is provided with a second thermal insulation layer on the side facing the first heat sink 24.

Exemplarily, the first thermal insulation layer and the second thermal insulation layer are thermal insulation paint or the like.

The first thermal insulation layer and the second thermal insulation layer both have a thermal insulation effect to reduce energy transfer between the first heat sink 24 and the second heat sink 25.

With the provision of a first thermal insulation layer on the side of the first heat sink 24 facing the second heat sink 25, or a second thermal insulation layer on the side of the second heat sink 25 facing the first heat sink 24, or a first thermal insulation layer on the side of the first heat sink 24 facing the second heat sink 25 and a second thermal insulation layer on the side of the second heat sink 25 facing the first heat sink 24, transfer of cold and heat between the first heat sink 24 and the second heat sink 25 can be reduced, thereby improving stability of the temperature control apparatus 20 in controlling the temperature inside the box 10.

It can be understood that the first thermal insulation layer and the second thermal insulation layer both have an avoidance zone to avoid the semiconductor cooling sheet 21.

According to some embodiments of this application, the first heat sink 24 is bonded to the cooling surface and the first fan 22 is fixedly connected to the first heat sink 24 via a first fastener; and the second heat sink 25 is bonded to the heating surface and the second fan 23 is fixedly connected to the second heat sink 25 via a second fastener.

Exemplarily, the first heat sink 24 is bonded to the cooling surface via a thermally conductive adhesive, and the first fan 22 is fixedly connected to the first heat sink 24 via a first fastener such as screw. Similarly, the second heat sink 25 is bonded to the heating surface via a thermally conductive adhesive, and the second fan 23 is fixedly connected to the second heat sink 25 via a second fastener such as screw.

The foregoing assembly method can not only reduce the connectors for product assembly, but also help to improve the stability of the installation and fastening of the first fan 22 and the second fan 23, and help to improve efficiency of product assembly.

According to some embodiments of this application, the first heat sink 24 and/or the second heat sink 25 includes a sheet heat sink or a honeycomb heat sink.

The sheet heat sink or honeycomb heat sink has high thermal conductivity and high heat dissipation efficiency. Specifically, the sheet heat sink or honeycomb heat sink has a thermally conductive sheet that fits with the cooling surface of the semiconductor and has a heat dissipation channel or heat dissipation gap for heat dissipation.

Exemplarily, the first heat sink and the second heat sink are both aluminum alloy heat sinks.

The sheet heat sink or honeycomb heat sink is simple in structure and easy to assemble. In addition, the sheet heat sink or honeycomb heat sink is easy to process and mold, suitable for mass production.

According to some embodiments of this application, the battery formation and grading device 100 further includes a temperature sensor and a controller electrically connected to the temperature sensor, the first fan 22, and the second fan 23. The temperature sensor is provided in the box 10 and configured to monitor temperature inside the box 10, and the controller is configured to receive the temperature inside the box 10 monitored by the temperature sensor and implement control to make the semiconductor cooling sheet 21, the first fan 22 and the second fan 23 operate when the temperature is higher than a preset temperature value.

The temperature sensor can sense the temperature and convert the temperature into an available output signal, and the controller has a switch for controlling the power on and off of the semiconductor cooling sheet 21. The controller is electrically connected to the temperature sensor, the first fan 22, or the second fan 23 in a wired or wireless manner, so as to receive the temperature inside the box 10 monitored by the temperature sensor in real time and control the start and stop of the first fan 22 and the second fan 23.

The temperature inside the box 10 is monitored in real time using the temperature sensor and transmitted to the controller in real time. When the temperature inside the box 10 is higher than the preset temperature value, the controller implements automatic control to make the semiconductor cooling sheet 21, the first fan 22, and the second fan 23 operate, so as to regulate the temperature inside the box 10, improving automation level of the product.

Refer to FIG. 1, FIG. 3, and FIG. 4, according to some embodiments of this application, the box 10 includes a top barrier plate 11, a bottom barrier plate 12, and a side plate assembly arranged between the top barrier plate 11 and the bottom barrier plate 12 to form an enclosure. The temperature control apparatus 20 is provided on the top barrier plate 11 and/or the side plate assembly.

The top barrier plate 11 is located above the bottom barrier plate 12, and the side plate assembly is arranged between the top barrier plate 11 and the bottom barrier plate 12 to form an enclosure and defines an accommodating space 17 for holding the rack 30, the formation apparatus, and the grading apparatus. The temperature control apparatus 20 may be provided at least on the top barrier plate 11, on the side plate assembly, or on both the top barrier plate 11 and the side plate assembly to facilitate temperature regulation in the box 10 based on an actual requirement.

Specifically, there are multiple temperature control apparatuses 20, and the multiple temperature control apparatuses 20 are spaced apart on the side plate assembly.

Refer to FIG. 1, FIG. 3, and FIG. 4. According to some embodiments of this application, the side plate assembly includes a first side plate 13, a second side plate 14, a third side plate 15, and a fourth side plate 16 that are connected in sequence. The first side plate 13 and the third side plate 15 are opposite each other, and the second side plate 14 and the fourth side plate 16 are opposite each other. One of the first side plate 13 and the second side plate 14 is provided with a fire door 151, and the other is provided with an inlet/outlet 131 for battery transporting.

Specifically, the top barrier plate 11, the bottom barrier plate 12, and the side plate assembly are all flame retardant plates.

With the top barrier plate 11, the bottom barrier plate 12, and the side plate assembly provided as flame retardant plates, as the flame retardant plates have a fire-extinguishing effect, when a fire breaks out in the box body 10, the risk of fire spreading to the outside can be reduced, and the risk of the flame entering the inside of the box 10 when an open flame appears outside the box 10 can be reduced too, thereby improving safety of using the product.

The fire door is configured to open when fire breaks out, so that devices and personnel inside the box 10 can be transported outside of the box 10. The battery inlet/outlet 131 is configured to open when batteries are being transported to the inside of the box 10 or outside of the box 10 to improve the efficiency of battery transporting.

Specifically, the fire door 151 is provided on the third side plate 15 and the inlet/outlet 131 is provided on the first side plate 13. Further, the third side plate 15 has a fire port, and the fire door 151 is slidably connected to the third side plate 15 so that the fire port can be opened or closed. The first side plate 13 has a first plate body and a second plate body, the first plate body is rotatably connected to the fourth side plate 16, and the second plate body is rotatably connected to the second side plate 14 so that the inlet/outlet 131 for battery transporting can be opened or closed when rotating. Alternatively, the third side plate 15 includes a first plate body and a second plate body, the second plate body is disposed below the first plate body and movable up and down relative to the second plate body, so that the inlet/outlet 131 can be opened when rising and closed when falling.

Refer to FIG. 4. According to some embodiments of this application, the battery formation and grading device 100 further includes a rack 30, a formation apparatus (not shown in the figure) and a grading apparatus (not shown in the figure). The rack 30 is provided in the accommodating space 17 for battery supporting, and the formation apparatus and the grading apparatus are also provided in the accommodating space 17.

The rack 30 has a storage location to support batteries so as to improve stability of the battery during charging and discharging, the formation apparatus is provided in the accommodating space 17 and configured for battery formation, and the grading apparatus is provided in the accommodating space 17 and configured for battery grading.

Specifically, the purpose of formation is to convert at the first charge active material inside the battery into substance having normal electrochemical effect, so that an effective purification film or solid electrolyte interface film is formed on the surface of a negative electrode of the battery. Grading is a process of charging and discharging the activated battery for several full-load cycles to screen the capacity size of the battery and thus determine the grade of the battery. In this way, the battery can be stably formed and graded in the box.

Refer to FIG. 1 to FIG. 6. According to some embodiments of this application, this application provides a battery formation and grading device 100 including: a box 10, a temperature control apparatus 20, a rack 30, a formation apparatus, and a grading apparatus. The box 10 has an accommodating space 17 for battery supporting, and the rack 30, the formation apparatus and the grading apparatus are all provided in the accommodating space 17. Specifically, the box 10 includes a top barrier plate 11, a bottom barrier plate 12, and a side plate assembly arranged between the top barrier plate 11 and the bottom barrier plate 12 to form an enclosure. The side plate assembly is provided with a fire door and an inlet/outlet for battery transporting on opposite sides. Temperature control apparatus 20 is provided in plurality, and the plurality of temperature control apparatuses 20 are spaced apart on the side plate assembly. Each of the temperature control apparatuses 20 includes a semiconductor cooling sheet 21, a first heat sink 24, a first fan 22, a second heat sink 25, and a second fan 23. The cooling surface of the semiconductor cooling sheet 21 is disposed facing the inside of the box 10, and the heating surface is disposed facing the outside of the box 10. The first heat sink 24 and the second heat sink 25 are respectively bonded to the cooling surface and the heating surface of the semiconductor cooling sheet 21. The first fan 22 is provided on a side of the first heat sink 24 back from the semiconductor cooling sheet 21 for blowing cold generated by the cooling surface into the box 10, and the second fan 23 is provided on a side of the second heat sink 25 back from the semiconductor cooling sheet 21 for blowing heat generated by the heating surface out of the box 10. The technical solution of this embodiment not only improves the efficiency of cooling inside of the box 10, but also helps to reduce the cost of production.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manners. This application is not limited to the specific embodiments disclosed in this specification but includes all technical solutions falling within the scope of the claims.

The invention claimed is:

1. A battery formation and grading device comprising:
a box having an accommodating space; and
a temperature control apparatus, provided on the box, comprising a semiconductor cooling sheet, wherein two opposite sides of the semiconductor cooling sheet are configured as a cooling surface and a heating surface, the cooling surface being arranged facing the inside of the box and the heating surface being arranged facing the outside of the box, wherein
the temperature control apparatus further comprises:
a first fan and a second fan, wherein the first fan is provided on the cooling surface and is configured to blow air into the box, and the second fan is provided on the heating surface and is configured to blow air outside of the box;
a first heat sink disposed between the cooling surface and the first fan and fitting with the cooling surface; and
a second heat sink disposed between the heating surface and the second fan and fitting with the heating surface; and
the first heat sink is provided with a first thermal insulation layer on a side facing the second heat sink; and
the second heat sink is provided with a second thermal insulation layer on a side facing the first heat sink.

2. The battery formation and grading device according to claim 1, wherein the first heat sink is bonded to the cooling surface and the first fan is fixedly connected to the first heat sink via a first fastener; and/or,
the second heat sink is bonded to the heating surface and the second fan is fixedly connected to the second heat sink via a second fastener.

3. The battery formation and grading device according to claim 1, wherein the first heat sink and/or the second heat sink comprises a sheet heat sink or a honeycomb heat sink.

4. The battery formation and grading device according to claim 1, wherein the battery formation and grading device further comprises: a temperature sensor disposed in the box and configured to monitor temperature in the box; and
a controller electrically connected to the temperature sensor, the first fan, and the second fan.

5. The battery formation and grading device according to claim 1, wherein the box comprises: a top barrier plate, a bottom barrier plate, and a side plate assembly arranged between the top barrier plate and the bottom barrier plate to form an enclosure, and
the temperature control apparatus is provided on the top barrier plate and/or the side plate assembly.

6. The battery formation and grading device according to claim 5, characterized in that the side plate assembly comprises a first side plate, a second side plate, a third side plate, and a fourth side plate connected in sequence, wherein
the first side plate and the third side plate are opposite each other, and the second side plate and the fourth side plate are opposite each other, with one of the first side plate and the second side plate provided with a fore door and the other one provided with an inlet/outlet for battery transporting.

7. The battery formation and grading device according to claim 5, wherein the top barrier plate, the bottom barrier plate, and the side plate assembly are all flame retardant plates.

8. The battery formation and grading device according to claim 1, wherein the battery formation and grading device further comprises:
a rack disposed in the accommodating space for battery supporting;
a formation apparatus disposed in the accommodating space; and
a grading apparatus disposed in the accommodating space.

* * * * *